United States Patent [19]

Vitous

[11] Patent Number: 5,245,914
[45] Date of Patent: Sep. 21, 1993

[54] DUAL TEA BREWER

[76] Inventor: Charles J. Vitous, 1435 S. Maple Ave., Berwyn, Ill. 60402

[21] Appl. No.: 6,715

[22] Filed: Jan. 21, 1993

Related U.S. Application Data

[63] Continuation of Ser. No. 833,804, Feb. 10, 1992, abandoned, which is a continuation of Ser. No. 584,451, Sep. 18, 1990, abandoned.

[51] Int. Cl.⁵ ............................................. A47J 31/00
[52] U.S. Cl. ...................................... 99/280; 99/295; 99/307; 99/285
[58] Field of Search ................. 99/279, 280, 281, 282, 99/295, 300, 304, 306, 307, 305, 316, 285

[56] References Cited

U.S. PATENT DOCUMENTS

| | | | |
|---|---|---|---|
| 3,593,650 | 7/1971 | Martin et al. | 99/307 |
| 4,207,809 | 6/1980 | Brill | 99/306 |
| 4,309,939 | 1/1982 | Stover | 99/295 |
| 4,579,048 | 4/1986 | Stover | 99/295 |
| 4,621,571 | 11/1986 | Roberts | 99/290 |

Primary Examiner—Harvey C. Hornsby
Assistant Examiner—Reginald L. Alexander
Attorney, Agent, or Firm—Myers & Associates, Ltd.

[57] ABSTRACT

The invention herein described is a tea brewer comprising a plurality of removable dispensers which are filled from a central brewing unit. The central brewing unit comprehends provisions for developing a tea extract or concentrate which is then contemporaneously mixed with a dilutant within one of the removable dispensers; the ratio of extract to dilutant being controlled to provide a potable mixture.

7 Claims, 6 Drawing Sheets

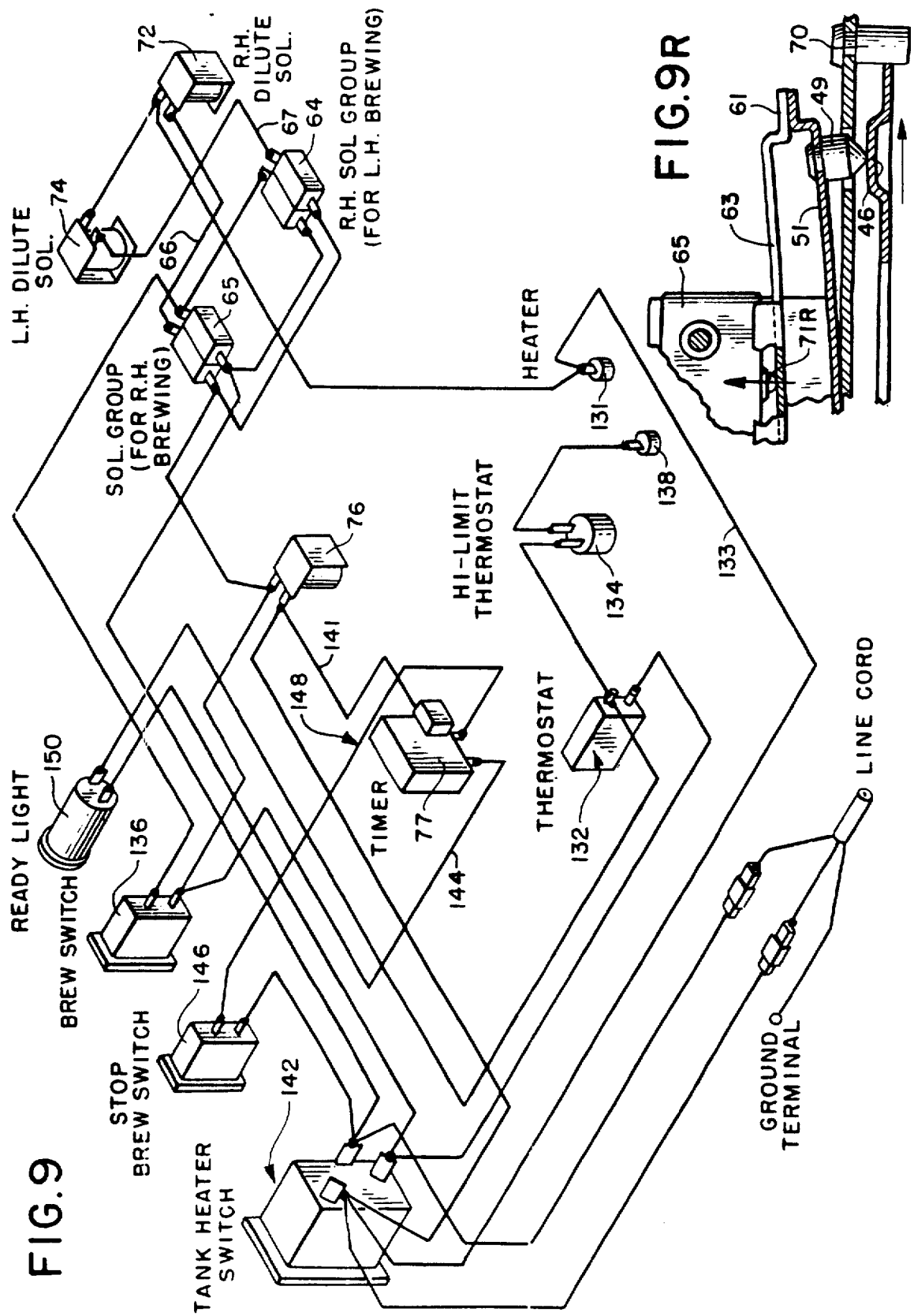

DUAL TEA BREWER

This is a continuation of co-pending application Ser. No. 833,804, filed Feb. 10, 1992, now abandoned which is a continuation of co-pending application Ser. No. 584,451 filed Sep. 18, 1990 now abandoned.

BACKGROUND OF THE INVENTION

This invention relates to tea brewers which unlike coffee brewers need among other requirements a predetermined steeping time for brewing an acceptable extract.

The invention contemplates a tea brewer which comprises a central control support, or pedestal assembly, and a pair of receptacles which are carried on the base of the pedestal and which are alternatively fillable from a brewing chamber which is shiftably carried by the pedestal into position to discharge the extract to a selected receptacle.

The invention primarily is directed to the fast food industry by providing a high volume tea making apparatus and dispensing successive batches of tea into alternate receptacles so that when one container is dispensing the tea, the other container is being filled with a fresh batch. The intent is to brew fresh batches in quantities sufficient to satisfy demand without the necessity of making large batches and then storing them in several containers and eventually discarding the deteriorated old brew.

In view of the difficulties in obtaining good restaurant help, it is necessary to provide equipment which requires minimum maintenance by the employees. It is imperative to provide equipment which will make a sufficient volume of brew to meet the customer demands without over producing, but in adequate quantities which can be replenished within a reasonable time with minimum attention by the employees.

A major problem with current brewing equipment, particularly for tea, is that, unlike coffee, the tea has to be steeped for a considerable length of time with a measured volume of hot water to obtain a quality extract in adequate quantities.

From experience it has been ascertained that preferably the equipment must be compact and that the best approach is to provide a single main unit and several satellite units comprising containers which are arranged to receive alternate batches of the extract.

As described in our common assignee's U.S. Pat. No. 4,621,571 for a coffee maker, the instant assembly utilizes a brew chamber which is adjustable to alternate positions about a vertical axis for vertical alignment with circumferentially offset receptacle containers, the brewing chamber having a discharge aperture in its bottom offset radially outward of the axis of rotation of the brewing basket. The discharge aperture is sized to discharge a volume of liquid from the chamber at a rate commensurate with the time requirement for steeping the tea placed in the chamber to provide a quality extract.

The invention appertains to brewing tea by means of a siphon type brewing device which brews the tea into an extract for mixing with a greater volume of dilutant such as cool water in the proportion of ¼ concentrated tea extract to ¾ water.

During steeping the hot water is maintained at a temperature of about 200 degrees F.

It has been learned that it is necessary to control the volume of extract to cold water dilutant in the proportion of one quarter extract to three quarters cool water dilutant to obtain a potable drink.

The invention also comprehends a novel water flow system to a heater tank for heating the water to 200 degrees F. which is conducted to the brewing chamber and separately is diverted to a holding tank in which the cold water and tea extract are proportioned.

SUMMARY OF THE INVENTION

This invention is directed to a tea brewer which operates automatically after a brew basket or urn is filled with the proper amount of tea and the basket is shifted to a position actuating the electrical controls for heating the water and proportioning the hot—cold mixture of extract and water.

These and other objects and advantages inherent in and encompassed by the invention will become more apparent from the specification and drawings, wherein.

BRIEF DESCRIPTION OF THE DRAWINGS

FIG. 6R is a view comparable to FIG. 6L showing the structure at the right side of the unit.
FIG. 9 is an electrical circuit diagram.

DESCRIPTION OF THE INVENTION

Figure 1:
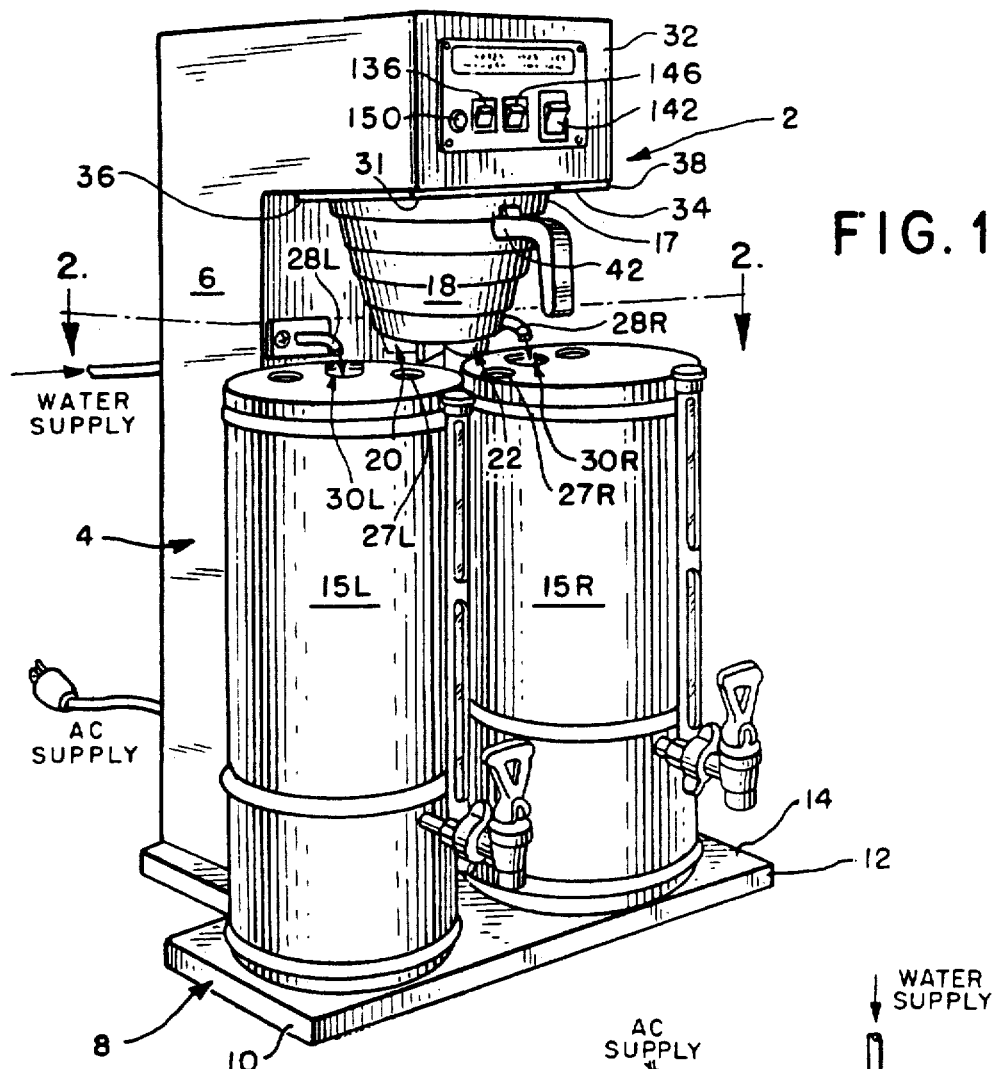
FIG. 1 is a side perspective view of my novel brewer.
Figure 2:
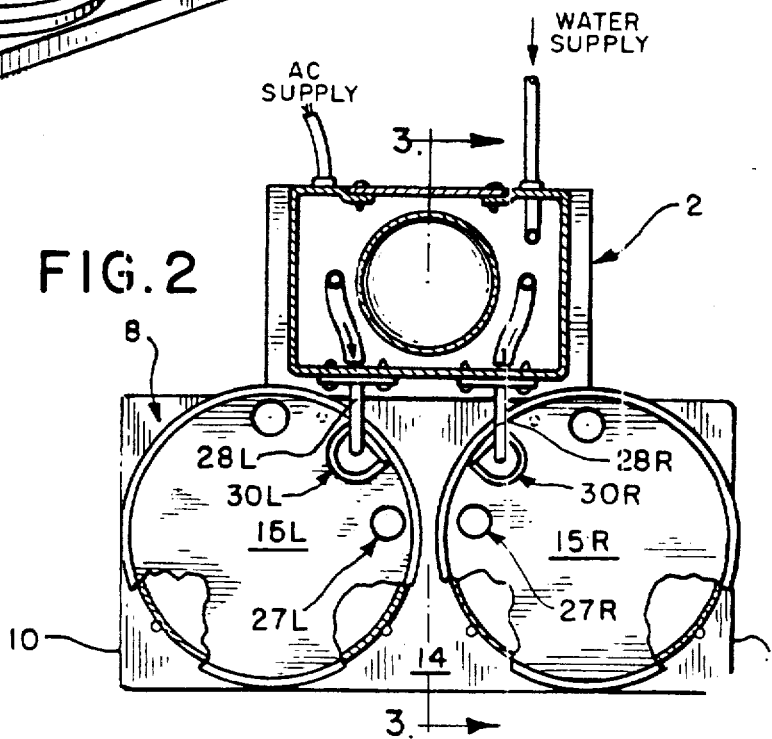
FIG. 2 is a cross-section taken substantially on line 2—2 of FIG. 1.

Referring to the drawings, a central tea brewing unit generally designated 2 comprises a housing or pedestal support 4 including an upright leg or standard 6 connected to a wide base 8 at its lower end. The base is elongated transversely to the standard and has two end portions 10 and 12 projecting beyond the opposite lateral sides of the standard and provide support on its horizontal top side 14 for a pair of laterally spaced right and left satellite dispensers or containers 15R and 15L.

Both containers 15R and 15L are serviced by a common brewing basket, brewer or urn 17 which comprises a funnel-like body portion 18 having a generally flat bottom 20 in which, offset from the center, there is provided adjacent to the periphery 22 of the bottom a drain or port 24 sized to drip at a predetermined rate the concentrate or extract which develops from steeping the tea placed in the basket, by the hot water introduced into the basket from a sprayer disc 25 carried by a bonnet 26 from the upright support stand such as shown in U.S. Pat. No. 4,603,621 which is incorporated herein by reference.

The basket positions the drain by rotating the basket about a vertical axis so that the drain is in vertical alignment so with an inlet opening 27R or 27L in a cover of the appropriate container. A separate dilutant spigot 28R or 28L is vertically aligned with an aperture 30R or 30L as shown in FIG. 1.

Figure 3:
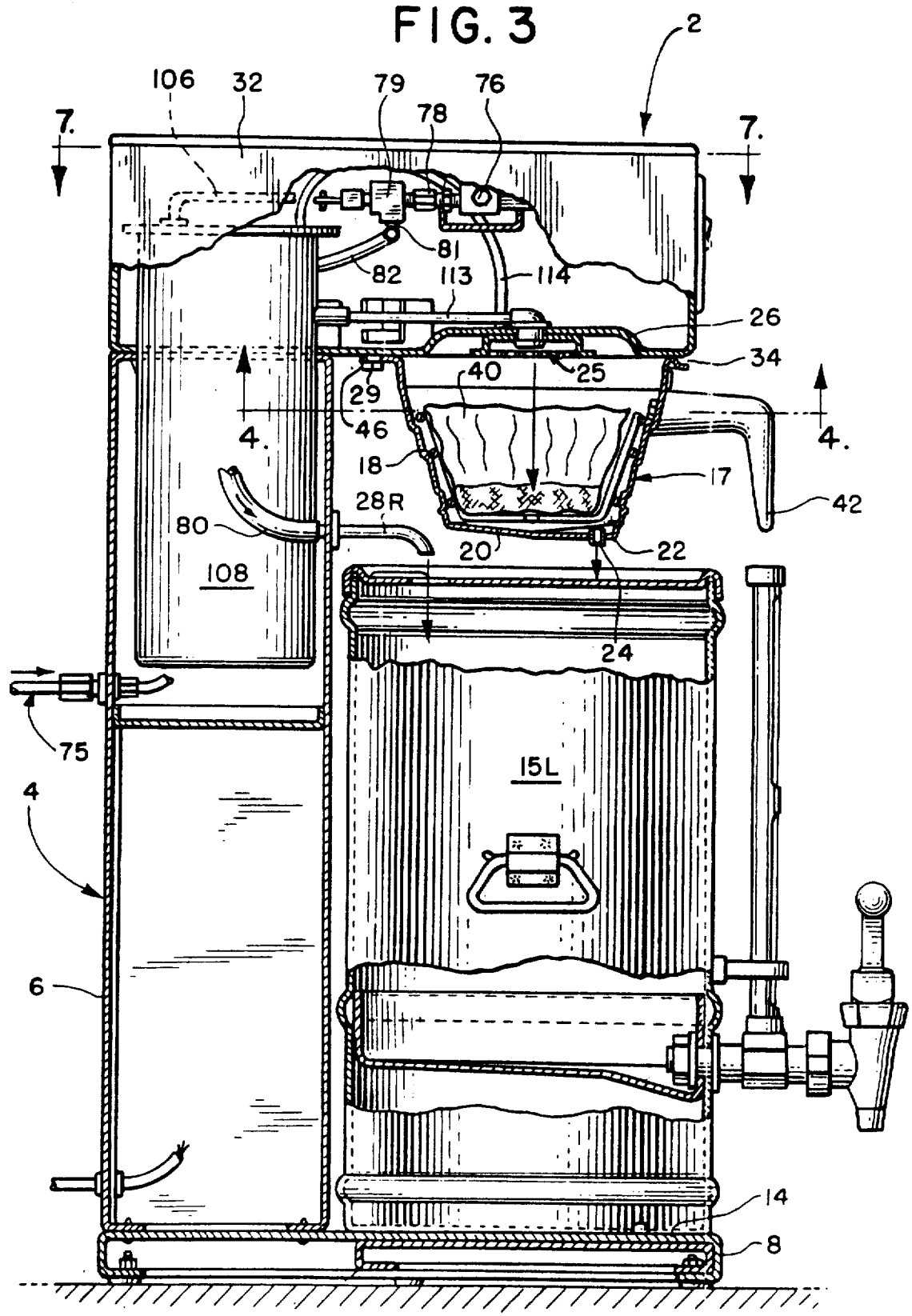
FIG. 3 is an enlarged side elevational view with parts broken away and shown in section.
Figure 4:
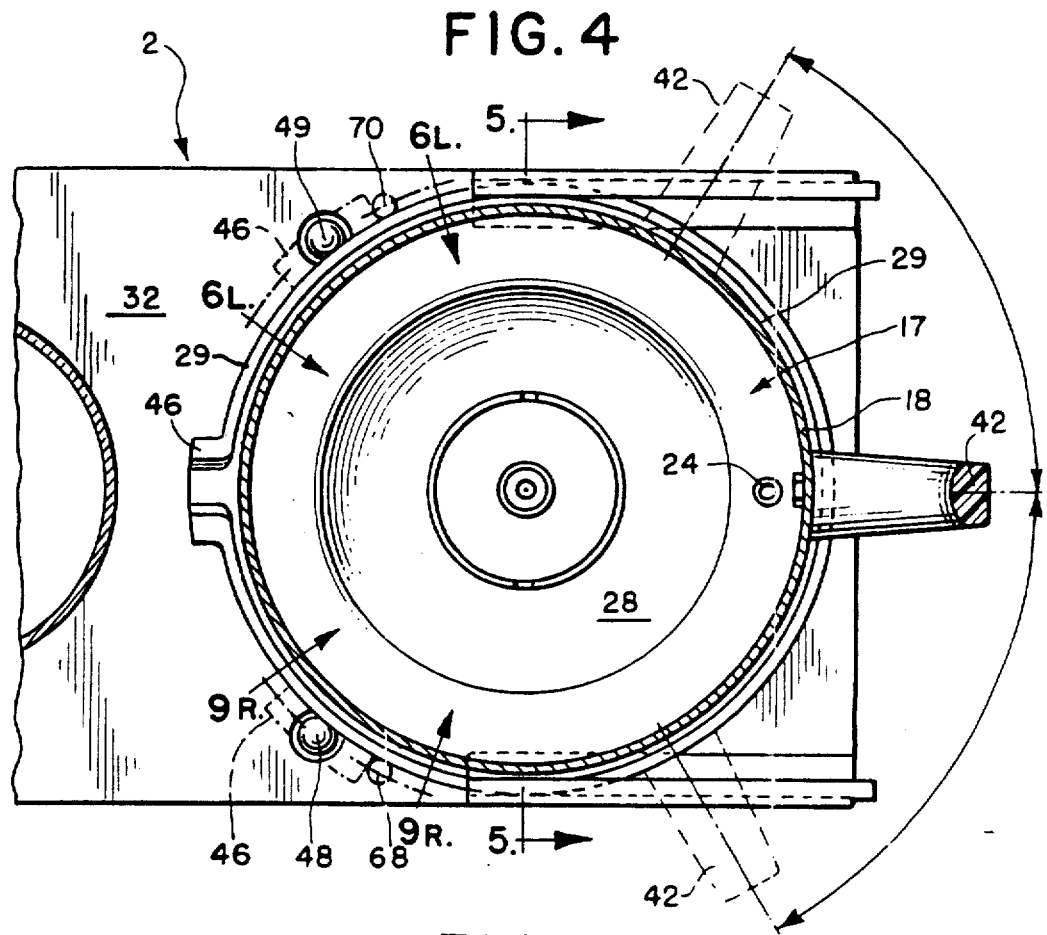
FIG. 4 is a horizontal sectional view taken substantially on line 4—4 of FIG,. 3.
Figure 5:
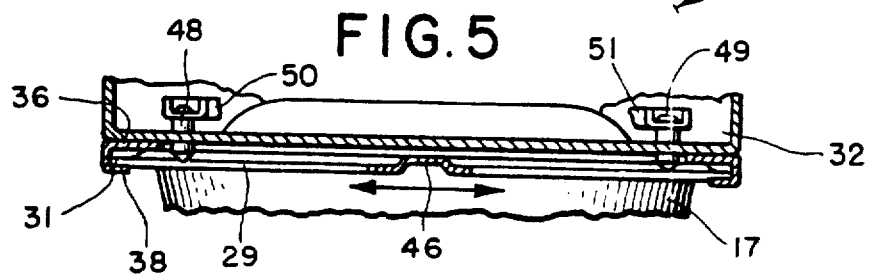
FIG. 5 is a fragmentary vertical sectional view taken substantially on line 5—5 of FIG. 4.
Figure 6L:
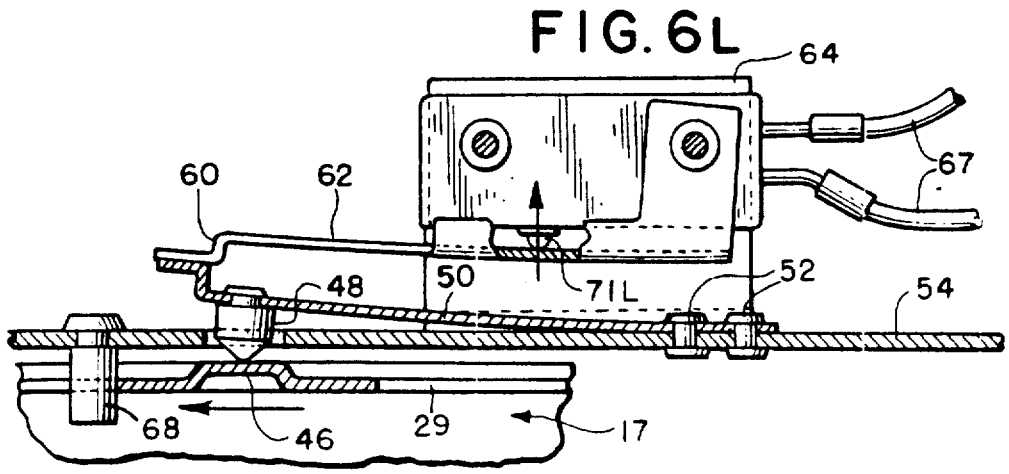
FIG. 6L is a further vertical sectional view taken on line 6—6 of FIG. 4.

It will be seen particularly in FIGS. 4 and 5 that the basket has an outturned peripheral flange 29 which fits into a horizontal slot 31 formed in the upper housing portion 32. The entry way 34 for the basket is provided in the front of the unit and is flanked by a pair of supporting guide rails 36, 38 into which the peripheral flange 29 of the basket is inserted after filling it with tea leaves in a paper filter 40 shown in FIG. 3.

Figure 7:
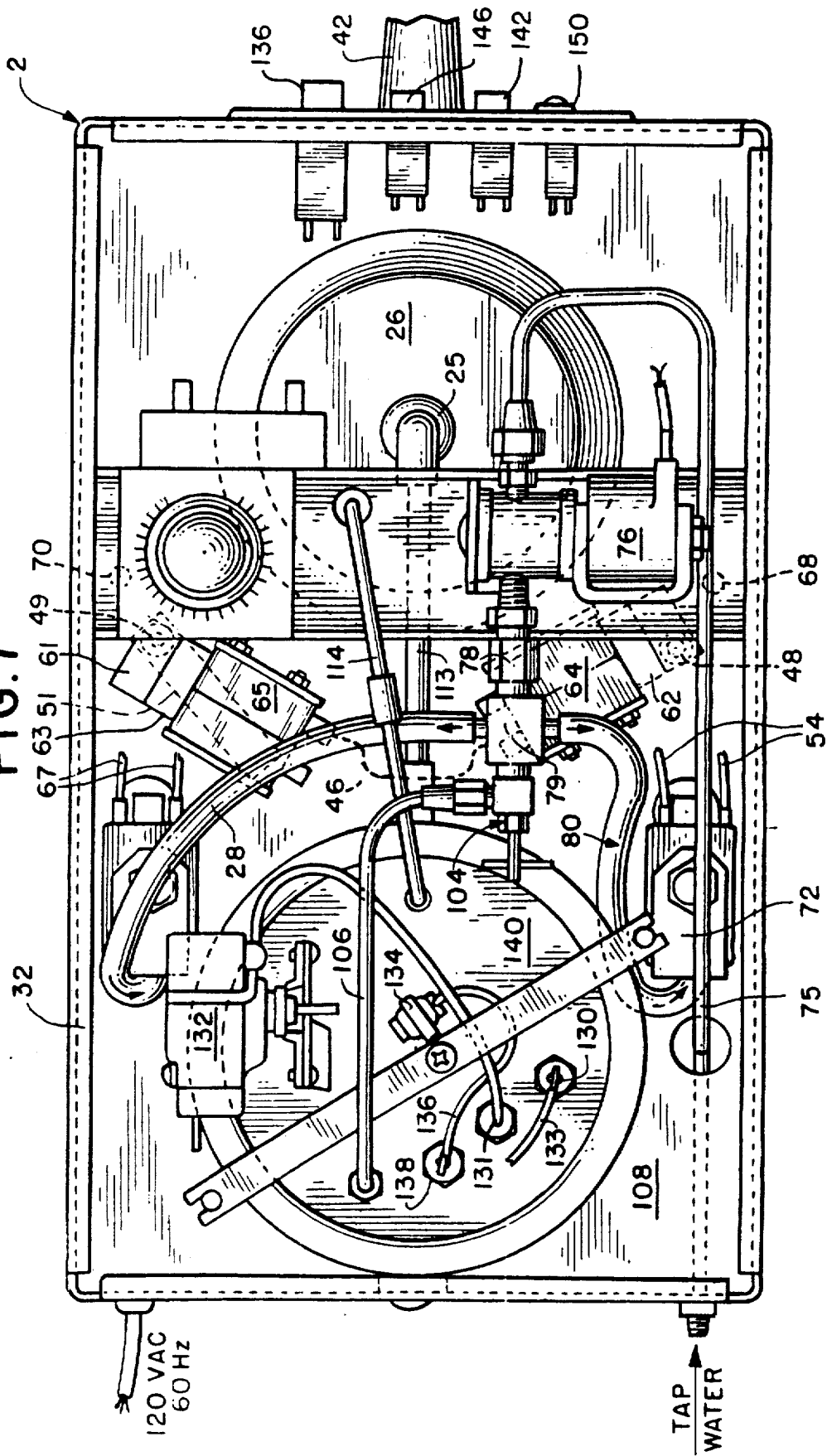
FIG. 7 is a horizontal sectional view taken substantially on line 7—7 of FIG. 3.

The basket has a handle 42 which is adapted to be grasped for rotating the basket from a neutral position as seen in FIG. 7 to positions left or right of neutral about a central axis as seen in phantom in FIG. 4. In the neutral position as seen in FIG. 4 all sequences are stopped. Shifting the basket to either left or right actuates an appropriate portion of the system.

To accomplish actuation, the flange 29 is provided, diametrically opposite to the handle 42, with a cam 46 which when the basket is rotated counter-clockwise causes the cam to be swung to the left and clockwise rotation causes the cam 46 to move to the right.

The cam 46 engages one of two lift pins 48, 49 each of which is fixed to one end of a corresponding leaf spring 50, 51 which is anchored at its other end as by rivets 52, 53 to a base plate 54 which forms part of a housing structure 32. Lifting of the spring by the cam engages the distal end 60, 61 of an operating arm 62, 63 of an associated switch 64, 65 carried by the base plate 54. Upward movement of the arm 62, 63 actuates a switch button 71R,71L of the respective switch 64, 65 to the on position inter-connecting the power lines 66, or 67. The rotation of the basket is limited by stop pins 68, 70 which project downwardly from the base plate 54 in the path of the cam 46. When the basket is rotated to counter-clockwise, the cam 46 engages stop 68 and when the basket is rotated clockwise the cam 46 engages stop 70.

The switch 64, is connected to a solenoid valve 72, and switch 65 is connected to and operates solenoid valve 74.

Figure 8:
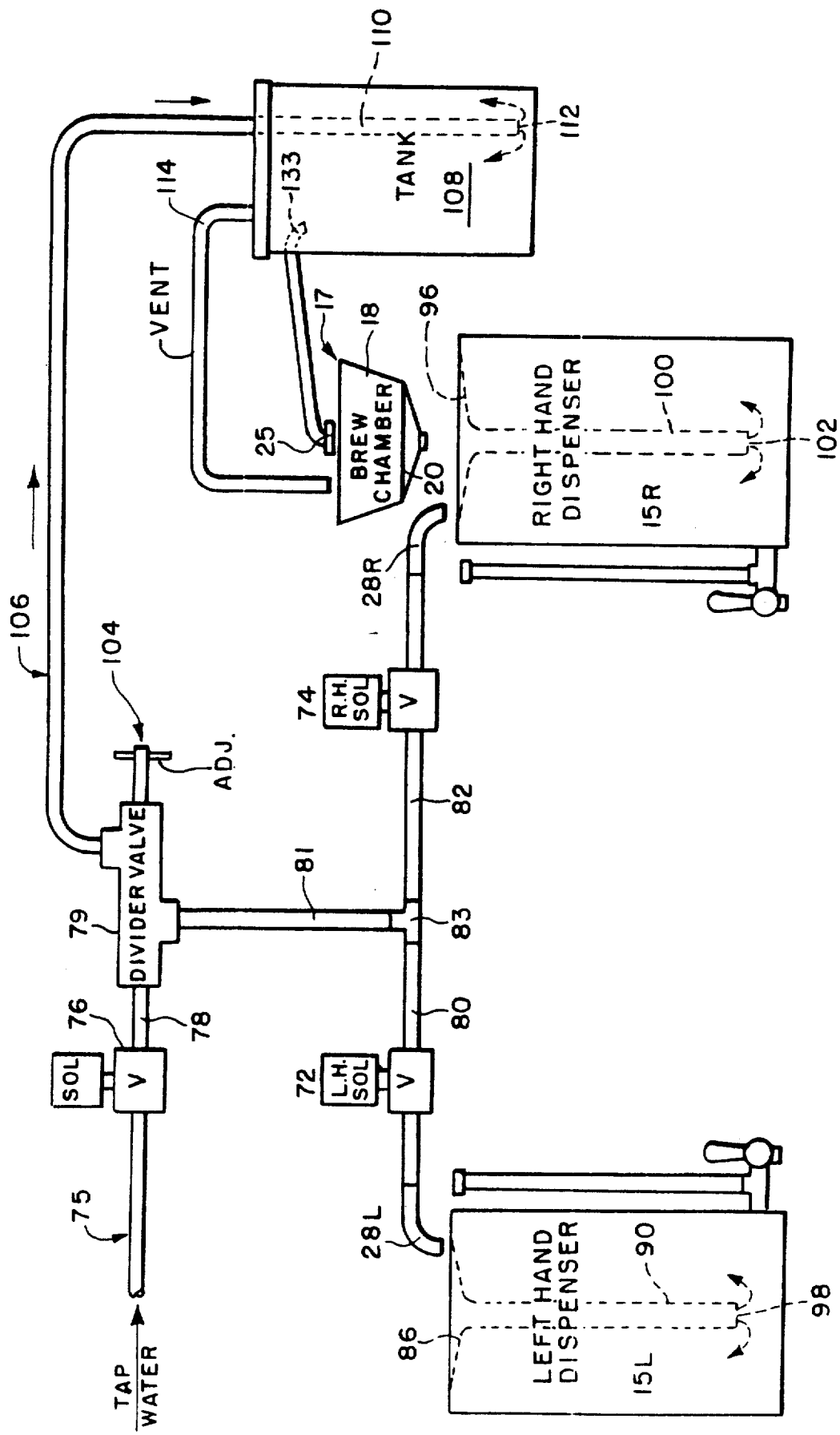
FIG. 8 is a piping diagram view.

As shown schematically in FIG. 8, and pictorially in FIG. 3, water is introduced into the unit from the rear by a pipe 75 through a solenoid valve 76 which is actuated by a timer 77 between closed and open positions. The water is conducted through a pipe line 78 to a T-shaped divider valve 79. The nonadjustable outlet is connected through a pipe 81 to a tee 83. Tee 83 is connected to branch lines or conduits 80, 82. Line 80 is connected through an anti-siphoning solenoid valve 72 to spigot 28L which discharges through aperture 30L in the cover at the upper end of the left hand dispenser 15L.

The other leg 82 of the tee 83 is controlled by an anti-siphoning solenoid valve 74 which is connected to a spigot 28R which discharges cold water, as does spigot 28L. The spigot 28R discharges through aperture 30R in the cover on the right hand dispenser 15R. Each cover is universal in construction, usable on either R.H. or L.H. dispensers.

The divider valve 79 is provided with a needle valve outlet 104 which is adjustable to control the flow of cool water through tube 106 into the hot water tank 108. The tank 108 has an inlet pipe 110 therein which has a lower end 112 positioned adjacent to the bottom of tank 108 for discharging the water into the tank. Any hot water in the tank rises and drains through a siphon tube 113 which has an inlet end connected through the wall of the tank, below the tank top. The tank area above the siphon tube 113 and the tank top, serves as a reservoir in the event that the rate of flow of incoming water exceeds that flowing from the spray disc 25.

The, siphon tube 113 terminates at a perforated spreader disc 25, which has its discharge end centered over the top of the brewing basket. This discharges into the appropriate dispenser as heretofore described, through the infundibulum upper end 86 or 96 of discharge tubes 90 or 100, which have their discharge ends 98 or 102 positioned at the lower end of dispensers 98 or 102 thereby thoroughly comingling the extract and dilutant into a potable mixture or product.

A vent pipe 114 extends from the top cover of the heating tank and hangs with its discharge end over the brewing basket so that in the event that water should overfill the hot water tank, it can serve as an additional drain, although its primary purpose is to vent the hot water tank.

In operation the brewing pot or chamber 17 is filled with an appropriate amount of tea leaves within the filter cup 40 positioned in the pot.

Then the pot has its peripheral flange inserted into the slot disposed in the housing fixed to the top of the standard. The pot is then rotated left or right to fill the appropriate dispenser 15L or 15R with cool water when the brewing pot is turned to the left drain 22 is vertically aligned with an aperture 27L in the cover of the left dispenser 15L. Similarly when the basket is moved to the right the brewing drain 22 is vertically aligned with an inlet aperture 27R in the dispenser 15R, which is also provided with a vent 115R.

The operation effects discharge of hot water from the hot water tank into the brew basket 17 and depending on the left or right positioning of the basket the appropriate brew extract and cold water will fill the respective dispenser in accordance with the time set by the timer.

It will be apparent that a novel effective system has been developed for alternatively filling either the right or left dispenser with the proper proportion of the extract and water.

Positioning the brewing to discharge into the selected container causes the appropriate micro-switch 64 or 65 to close while the one on the opposite side of the housing remains open. The closing of the circuit through the micro-switch causes the appropriate solenoid valve to open letting cold water to pass therethrough as stated in the description of FIG. 8.

The hot water tank is heated by one or more electrical heating probes or loops 130, 131, the temperature of which is controlled by a manually adjustable thermostat 132. The probes are electrified from an external source power line through wire 133 extending from an externally powered control switch 141 as shown in FIG. 9.

There is also provided a high limit thermostat 134 which is connected by a wire 136 to a sensor probe 138 which extends into the hot water tank and is mounted to the hot water tank cover 140.

Shown diagrammatically in FIG. 9, the electrical system comprises means for causing the injection of hot water into the brewing urn 17 on command and as the tea extract is being delivered to a preselected container, automatically introducing a predetermined amount of dilutant into the same container 15R or 15L.

Operation of the satellite tea brewing system is initiated by activation of the tank heater switch 142 connecting the unit to line power cable 143 said switch being defeatable by either the manually setable thermostat 132 or the preset high-limit thermostat 134. When operational parameters as determined by the thermostats are met, the operation of the unit is ready to proceed. Activating the brew switch 136 powers timer 77 which by wire 141 controls solenoid powered valve 76 allowing water to enter the tank 108 for a predetermined time which, since the water flow rate into the tank is known, allows a preset amount of water, after passage through the heating tank 108 to be introduced into the brewing urn 17. Simultaneously activated is either the solenoid valve 72 or 74 dependent on the orientation of cam 46; said orientation determined through action of the operator by positioning handle 42 allowing cam 46 to actuate switch 64 or 65. As extract leaves the urn 17 and pours into dispenser 15R or 15L dilutant is also being automatically added at a known flow rate to the preselected dispenser by action of switch/solenoid set 64/74 or 65/72. The duration of the dilutant solenoid being open is also determined by timer 77 which powers solenoids 72, 74 via a tap 144 to the brew switch 136 thence going to the hot water solenoid 76 and continuing to both solenoid control switches 64, 65.

An additional safety feature is included in the form of a brew stop switch 146 which acts via lead 148 to disable timer 77 thereby immediately closing solenoid 76 and terminating the flow of water into the unit in the event of accidental activation of the brewing cycle. Brew stop switch 146 can be activated to immediately abort the brew cycle.

Also provided is an indicator light 150 which is activated by thermostat 132 thereby notifying the operator that the water in tank 108 is at a sufficient temperature for commencing the brewing cycle.

This description is only indicative of the invention and is not to be considered as limiting of the scope of the invention but rather as exemplary of a preferred embodiment thereof.

I claim:

1. A satellite tea brewing system comprising:
   a central brewing unit including a housing,
   an upright tea brewing basket with an eccentrically positioned discharge port, said basket having means for mounting the basket about a vertical axis from said housing,
   a pair of dispensers positioned about said axis and having inlets at their upper ends,
   said basket being horizontally swingable about said axis for selectively aligning said discharge port with the inlets of respective dispensers,
   a pair of valve means for alternately selectively introducing a metered amount of cold water into each dispenser and
   valve means for conducting a metered amount of hot water into a basket for seeping the tea therein and for conducting dilutant cold water to one of said pair of valve means, including spring means on the mounting means and a spring-contacting cam on the basket operative to deflect said spring means attendant to selective positioning of the basket, said valve means including a valve, a timer, and a divider valve, said timer being operative coupled to said valve and said spring means,
   said basket being swingable to a first position to cause said spring means to actuate said valve and a selective one of said pair of valve means, said valve being upstream of said divider valve for introducing water into said divider valve, said divider valve acting to conduct a metered amount of hot water into the basket with said discharge port being aligned with the inlet of one of said pair of dispensers and to simultaneously discharge a selected amount of cold water through said one of said pair of valve means to said one of said pair of dispensers, and
   said basket being swingable to a second position to cause said spring means to actuate said valve for an interval controlled by said timer and the other of said pair of valve means, said valve introducing water into said divider valve and causing said divider valve to conduct a metered amount of hot water into the basket with said discharge port being aligned with the inlet of the other of said pair of dispensers and to simultaneously discharge a selected amount of dilutant cold water through the other of said pair of valve means to said other of said pair of dispensers.

2. The invention according to claim 1 and said pair of valve means comprising a pair of separate cold water conduits, and
   separate valves for closing off one conduit and opening the other conduit and vice versa in accordance with a correlated disposition of said basket.

3. The invention according to claim 2 and said divider valve connected to a source of cold water and connected to said valve means for introducing cold water, and means for limiting the discharge of water into said dispensers.

4. The invention according to claim 1,
   and a discharge valve for controlling the quantity of water introduced into said basket.

5. The invention according to claim 1,
   and said means for conducting water comprising a tank, timer means for controlling the quantity of cold water conducted into the tank and therefrom to the basket.

6. A satellite tea brewing system comprising:
   a central brewing unit including a housing,
   an upright tea brewing basket with an eccentrically positioned discharge port, said basket having means for mounting the basket about a vertical axis from said housing,
   a pair of dispensers positioned about said axis and having inlets at their upper ends,
   said basket being horizontally swingable about said axis for selectively aligning said discharge port with the inlets of respective dispensers,
   a pair of valve means for alternatively selectively introducing a metered amount of cold water into each dispenser,
   valve means for conducting a metered amount of hot water into the basket for steeping the tea therein and introducing cold water to one of said pair of valve means, said valve means including actuator means on the mounting mean and an actuator element on the basket operative to actuate said actuator means attendant to selective positioning of the basket, said valve means further including a valve operatively coupled to said actuator means and a divider valve downstream of said valve,
   said basket being swingable to a first position to cause said actuator means to actuate said valve for an interval controlled by said actuator means and one of said pair of valve means,
   said valve being upstream of a divider valve for introducing water into said divider valve, said divider valve acting to conduct a metered amount of hot water into the basket with said discharge port being aligned with the inlet of one of said pair of dispensers and to discharge a selected amount of dilutant through said one of said pair of valve means to said one of said pair of dispensers, and said basket being swingable to a second position to cause said actuator means to actuate said valve and the other of said pair of valve means, said valve acting to introduce water into said divider valve and cause said divider valve to conduct a metered amount of hot water into the basket with said discharge port being aligned with the inlet of the other of said pair of dispensers and to discharge a selected amount of dilutant cold water through the other of said pair of valve means to said other of said pair of dispensers.

7. The system according to claim 6 wherein said divider valve includes a valve element to control the ratio of the proportion of hot water and dilutant cold water.

* * * * *